INVENTOR:
THEODOR GEORGI
By
Kurt Kelman
AGENT

Oct. 9, 1962 T. GEORGI 3,057,639
REAR TRUCK ARRANGEMENT FOR A TRAILER
Filed June 27, 1960 4 Sheets-Sheet 2

INVENTOR:
THEODOR GEORGI
By Kurt Kelman
AGENT

Oct. 9, 1962 T. GEORGI 3,057,639
REAR TRUCK ARRANGEMENT FOR A TRAILER
Filed June 27, 1960 4 Sheets-Sheet 3

INVENTOR:
THEODOR GEORGI
By Kurt Kelman
AGENT

Oct. 9, 1962 T. GEORGI 3,057,639
REAR TRUCK ARRANGEMENT FOR A TRAILER
Filed June 27, 1960 4 Sheets-Sheet 4

INVENTOR
THEODOR GEORGI
By
Kurt Kelman
AGENT

United States Patent Office 3,057,639
Patented Oct. 9, 1962

3,057,639
REAR TRUCK ARRANGEMENT FOR A TRAILER
Theodor Georgi, Frankfurt am Main, Germany
(5 Chappelihof, Steinegg (Appenzell), Switzerland)
Filed June 27, 1960, Ser. No. 38,875
6 Claims. (Cl. 280—81)

This invention relates to towable vehicles, and more particularly to a rear truck arrangement for a trailer adapted to be towed by a motor tractor or the like.

Heavy trailers with multiple rear axles are equipped with a rear truck frame which is rotatably mounted on the rear portion of the main trailer frame for pivotal movement about a vertical axis to facilitate movement of the trailer on curved roads. The truck frame carries the rear axles. Steering means must be provided for keeping the truck in a predetermined angular position relative to the main trailer frame in order to make the trailer follow the path of the towing vehicle so that the combined track of the towing vehicle and of the trailer be as narrow as possible. Any wide deviation of trailer movement from the path traveled by the towing vehicle is a hazard to the safety of the trailer train and of other road users.

In an attempt to control the angular displacement of the rear truck frame of a trailer, it has previously been proposed to connect the front end of the truck frame with a point in the median plane of the main frame forward of the rear truck by means of a steering rod the front end of which is hingedly connected to the main frame. The known arrangement of this type inherently requires the forward axle of the rear truck to be pushed forward by a connection with the main frame which is located rearward of the forward axle in the direction of normal trailer movement. Such a "pushed axle," however, is known to be in an unsteady condition, and to tend to swerve erratically from the desired course. Additional means has to be employed to control axle movement in such an arrangement.

It is an object of the invention to provide a rear truck arrangement for a towed vehicle in which undesirable swerving of the forward axle of the rear truck is reliably prevented.

Another object is the provision of a rear truck arrangement which causes the towed trailer to follow the path of the towing vehicle in a narrow track.

A further object is the provision of a rear truck arrangement in which the afore-cited objects are achieved with a forward axle on the rear truck which is being "pulled" rather than "pushed."

With these and other objects in view, I provide the rear truck of a trailer with a pivot on the forward axle. This pivot has an axis that extends in a forward direction from the axle and holds one end of a steering rod, the other end of which is connected to a universal joint on the trailer main frame forward of the rear truck.

The axis of the pivot by means of which the steering rod is fastened to the forward axle of the truck frame is approximately horizontal, and preferably slanted in a forward and downward direction, and the steering rod extends forward and upward from the pivot. A portion of the steering rod intermediate its ends is further connected to the main frame of the trailer by means of a link, two spaced portions of which are connected to the main frame and the steering rod respectively and restrict the latter to movement best described as defining a portion of a conical surface.

Other objects and many of the attendant advantages of this invention will be readily appreciated as the same becomes better understood by reference to the following detailed description of preferred embodiments thereof when considered in connection with the accompanying drawings in which like reference numerals designate like parts throughout the figures thereof, and wherein:

FIG. 1a shows a detail of a modification of the arrangement illustrated in FIG. 1;

FIG. 4 shows a detail of the device of FIGS. 2–3 in front elevational section;

Figure 1:
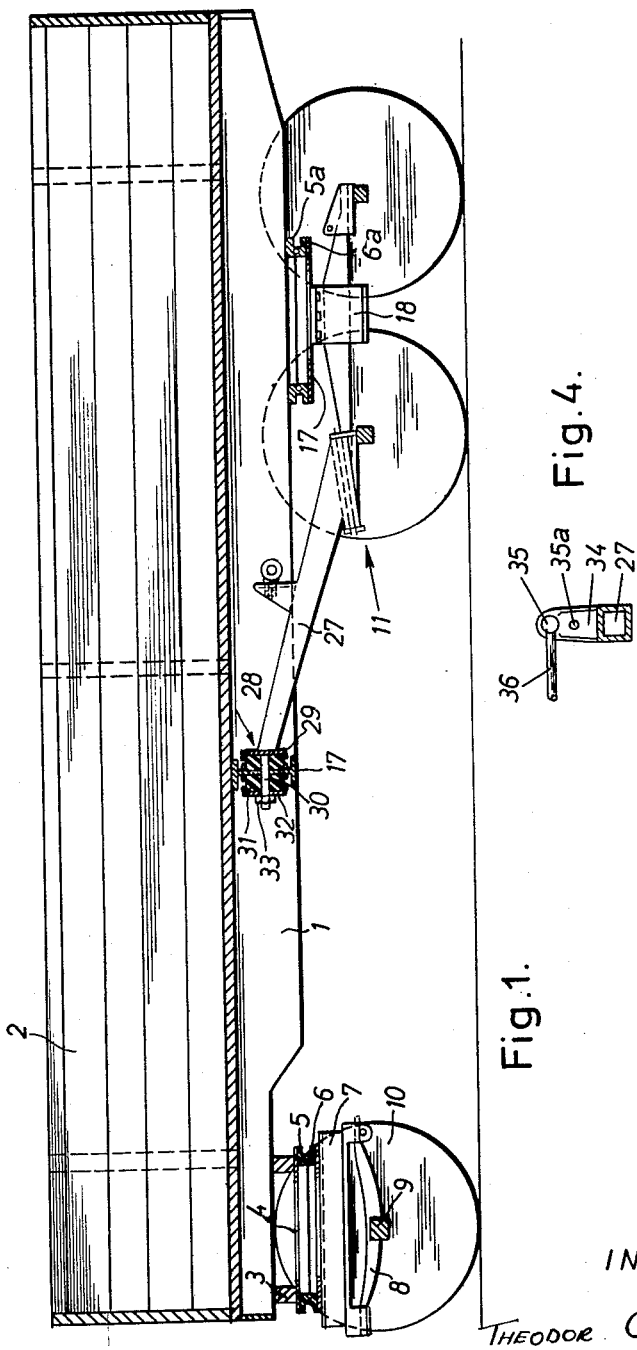
FIG. 1 is a side elevational sectional view of a trailer equipped with a first embodiment of the invention.

Referring now to the drawing, and initially to FIG. 1, there is seen a trailer having a frame 1 composed of longitudinal side rails and cross members in the usual manner. A body 2 is mounted on the frame. Traverse members 3 under the front portion of the frame 1 hold a base plate 4 to which an upper fifth wheel ring 5 is secured. The ring 5 cooperates with a lower fifth wheel ring 6 mounted on a bed plate 7 which is supported by wheels 10 to which it is connected by a conventional laminated leaf spring 8 and a front axle 9. The lower fifth wheel ring 6 and the supporting structures may be parts of a separate trailer.

This invention is more particularly concerned with the rear truck arrangement of a trailer and no further reference will be made to the front wheels and their suspension, but it will be understood that the several embodiments of the invention and their modifications disclosed hereinafter include rotatably mounted front wheel suspensions as shown in FIG. 1.

Figure 2:
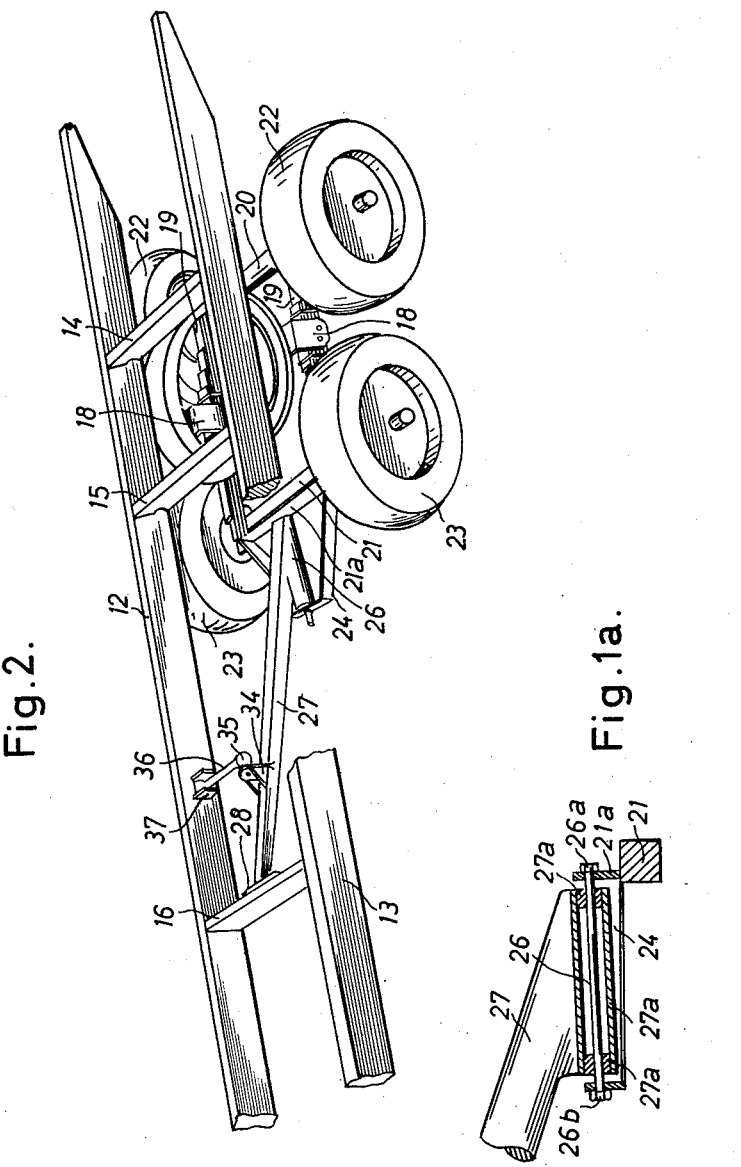
FIG. 2 is a fragmentary perspective view of the trailer of FIG. 1 with the body and parts of the main frame removed to reveal details of the rear truck frame arrangement of the invention.

As seen from FIG. 2, the two side rails 12 and 13 of the main trailer frame 1 and two cross members 14 and 15 form an approximately square support for an upper fifth wheel 5a which is in bearing engagement with a lower fifth wheel ring 6a mounted on a bed plate 17 which has been omitted from FIG. 2 so as not to obscure other features of the apparatus shown but is visible in FIG. 1. Two spring seats 18 are laterally attached to the bed plate 17 and thereby to the lower fifth wheel 6a. Two laminated leaf springs 19 are mounted in the spring seats in such a manner that their free ends extend forward and backward respectively from the respective spring seat 18.

The load carried by the springs 19 is transmitted to a forward axle 21 and a rearward axle 20. The latter is fixedly secured to the rearward free ends of the springs 19 in a conventional manner. The forward free ends of the springs 19 rest on top bearing faces of the forward axle 21 which is thus movable relative to the springs 19. Stub shafts laterally extending from the axles 20 and 21 carry two sets 22, 23 of rear wheels.

To limit the movement of the axle 21 in a direction away from the trailer frame 1, an abutment member may be mounted on the axle above the spring 19 for engagement with the latter when the axle 21 moves downward relative to the spring. Such an arrangement will be discussed in more detail in connection with the embodiment of the invention illustrated in FIG. 5.

Figure 3:
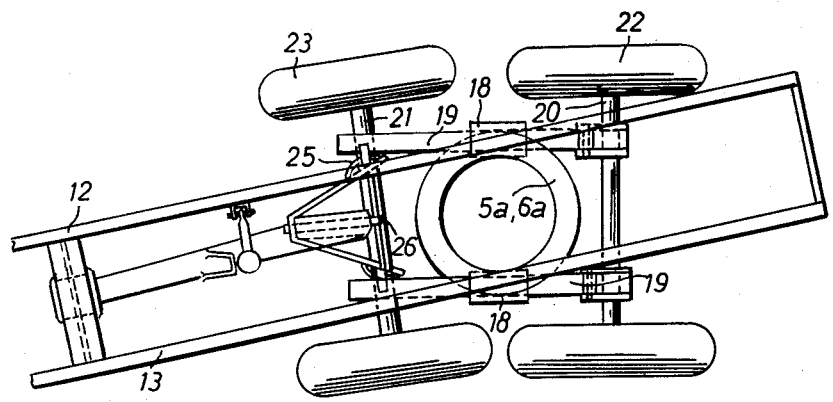
FIG. 3 is a somewhat diagrammatic plan view of the device of FIG. 2 in the position assumed when the trailer rounds a curve.

A V-shaped frame 24 has the free ends of its legs fastened to the forward axle 21 whereas the apex of the V-frame points forward as best seen in FIG. 3. The leg ends of the frame 24 carry arcuately shaped face members 25 the convex curvature of which faces the springs 19.

The face members 25 abut against the sides of the springs 19 and hold them in spaced relationship while permitting the axle 21 to rotate about a vertical axis relative to spring 19 as seen in FIG. 3.

A pivot pin 26 is secured between the axle 21 and the apex of the V-shaped frame 24 substantially equidistant from the wheels 23. The axis of the pivot pin 26 slopes downward and forward from the axle 21. In the alternative embodiment of the invention illustrated in FIG. 1a, the axis of the pivot pin 26 is approximately horizontal in the normal operating position of the trailer.

A tubular steering rod 27, the main portion of which has an approximately square cross section, as seen best in FIG. 4, is pivoted on the pin 26 and extends therefrom generally forward and upward toward the cross member 16 of the main trailer frame to which the front end 28 of the rod 27 is fastened. As seen in detail in FIG. 1, a universal joint permitting movement of the front end 28 in all directions within certain limits is formed by a fixed flange 29 on the steering rod and a pin 30 which loosely passes through a web portion of the cross member 16 which is an I beam. A loose flange 32 is held on the pin 30 by a nut 33. Rubber cushions 31 are interposed between the two flanges and the web portion of the cross member. The steering rod 27 is thus free to pivot about a horizontal and a vertical axis simultaneously, and may also move longitudinally with respect to the direction of trailer movement within the limits of compressibility of the rubber cushions 31.

A portion of the rod 27 between the two ends thereof carries an upwardly projecting lug 34 equipped with a ball and socket joint. As best seen from FIG. 1, the socket member of the joint has a threaded pin attached thereto. The pin passes through an opening in the lug 34 and carries a nut on the other side of the lug by means of which the socket member is fastened to the lug 34. As shown in FIG. 4, the lug 34 is formed with an additional bore 35a nearer the main portion of the steering rod 27 so that the vertical spacing between the steering rod 27 and the ball-and-socket joint 35 may be adjusted.

The ball member of the joint 35 is integral with a link 36, best seen in FIGS. 2 and 3, which is hinged to the side rail 12 of the main trailer frame by a pivot 37, and is adapted to swing in a plane which is transverse to the direction of trailer movement.

The pivotal connection of the steering rod 27 with the cross member 16, the axle 21 and the link 36 limits the steering rod to a range of movements which define a conical surface and hold the forward axle of the truck at an angle to the rearward axle which causes the trailer to move in a narrow track in the path of the tractor, and prevent the radial component of the forces effectively applied to the rear wheels from pulling the rear end of the trailer towards the center of curvature when the trailer train moves around a curve.

The apex angle of the conical surface referred to above is influenced by the angle which the axis of the pivot pin 26 forms with the horizontal direction of vehicle movement, and by the position of the socket member of the joint 35 on the lug 34. By varying the angle and by changing the position of the joint between the lug 34 and the link 36, the angular displacement of the forward axle 21 in response to the forces set up when the trailer rounds a curve can be adjusted. Such an adjustment is required when the wheel base of the trailer changes. The pin axis will normally be permanently positioned prior to installation of the pin 26 on a trailer according to the spacing of the front and rear fifth wheels. Shifting the socket member of the joint 35 permits ready compensation for those relatively minor changes in effective wheelbase which occur when the trailer is attached to tractors in which the fifth wheel is differently aligned with the rear wheels of the tractor in a longitudinal direction.

Figure 6:
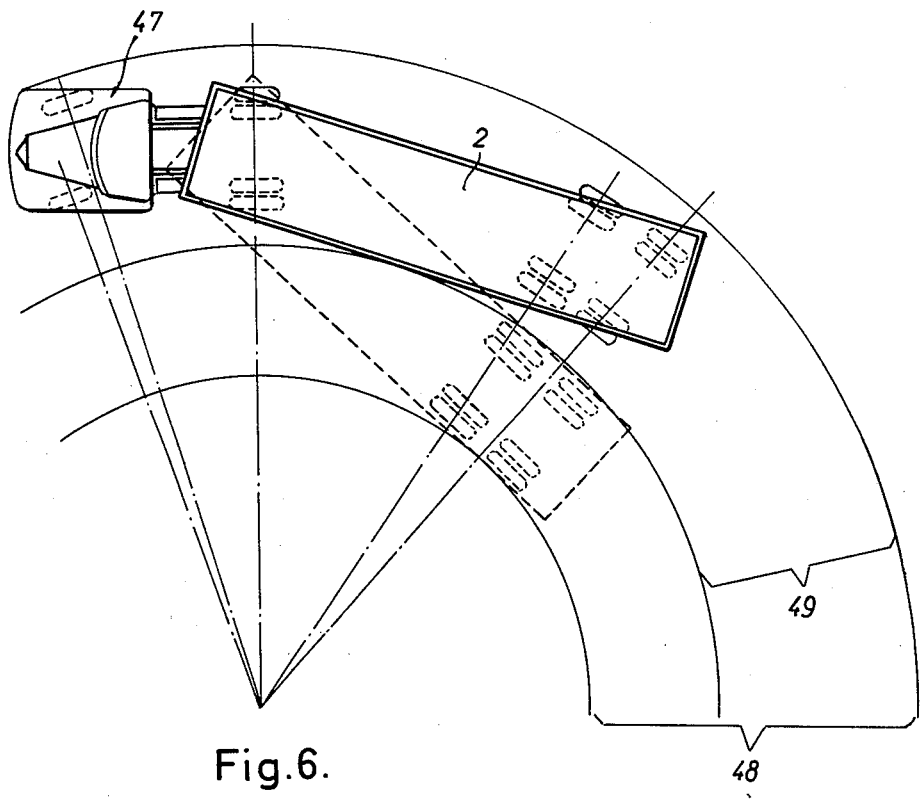
FIG. 6 is a diagram showing the tracking behaviour of a trailer train of the invention as compared to a trailer train of conventional design.

FIG. 6 illustrates the effect of the rear truck arrangement of the invention, as applied to a trailer 2 towed by a tractor 47 around a circular curve. In the fully drawn trailer of the invention, which in the instant case is a semi-trailer, the axes of the rear wheels meet in the point which is common to the axes of the front and rear wheels of the tractor 47. The wheels of each side of the trailer train move in approximately the same circular path, and the track 49 is as narrow as the length of the trailer and the radius of curvature permit.

In the conventional trailer shown in dotted lines, the rear end is pulled inward toward the center of curvature by the forces resulting from the traction of the tractor and the frictional interaction of the wheels with the road surface. The track 48 is substantially wider than the track 49. It will be understood that the condition shown constitutes an extreme case not frequently encountered in actual practice, and is shown for the purpose of illustration. The deviations from a narrow track by trailers not equipped with the rear truck arrangement of the invention are substantial enough though to constitute a serious traffic hazard, and to cause a very significant increase in tire wear.

Figure 5:
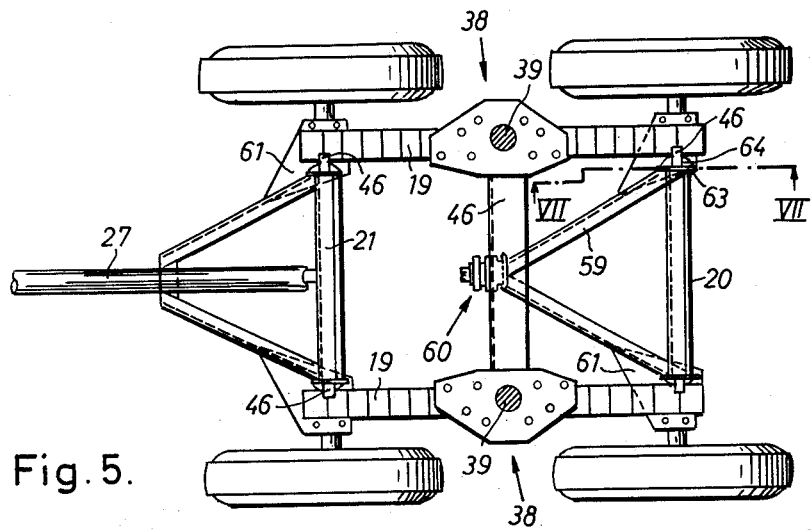
FIG. 5 shows another embodiment of the invention in a view corresponding to that of FIG. 3.

An alternative embodiment of the invention is shown in FIG. 5 in a view generally corresponding to that of FIG. 3. The movement of the forward axle 21' is controlled by a steering rod 27 in the same manner as described above in connection with the embodiment shown in FIGS. 1 to 4, and therefore not requiring further detailed treatment.

The truck arrangement shown in FIG. 5 includes two laminated leaf springs 19 which are mounted in respective spring brackets 38 and adapted to pivot about vertical pins 39. The two spring brackets 38 are connected by a rigid cross member 40. The rear axis 20' forms one side of a triangular frame 41 the apex of which is mounted in the cross member 40 by means of a universal joint 42 substantially identical in function and structure with the joint which connects the front end 28 of the steering rod 27 to the cross member 26, and described above. The ends of the axles 20' and 21' are covered with supporting plates 43 which are slidably engaged from above by the ends of the springs 19. To guide movement of the springs relative to the axles, the latter carry vertical brackets 44 at their ends which are equipped with spherical guide faces 45. These guide faces function in a manner analogous to the face member 25 of the V-shaped frame 24 shown in FIGS. 1 to 4. To prevent the springs 19 from being lifted from the axles, abutment pins 46 project from the vertical brackets 44 above the free ends of the springs 19.

Because of the connection of the steering rod 27 to the main frame of the trailer, the axle 21' is deflected from the position shown in FIG. 5 when the trailer runs through a curve in a road. This causes the springs 19 to pivot about their pins 39 in the brackets 38, and induces a corresponding movement of the rear axle 20' which is capable of angular displacement because of the linkage provided by the frame 41 and the universal joint 42.

Obviously many modifications and variations of the present invention are possible in the light of the above teachings. It is therefore to be understood that within the scope of the appended claims the invention may be practiced otherwise than as specifically described.

What I claim is:
1. In a vehicle, in combination,
 (a) an elongated main frame having a front portion and a rear portion;
 (b) truck means rotatable on said rear portion about a normally vertical axis;
 (c) forward axle means rotatable on said truck means about a normally vertical axis;
 (d) rearward axle means secured on said truck means against rotation in a horizontal plane and spaced from said forward axle means in a direction away from said front portion;

(e) a pivot on a said forward axle means, said pivot having an axis extending in a forward direction;

(f) elongated steering rod means having two spaced ends, one end being secured on said pivot against rotation of said steering rod means about any axis inclined relative to the axis of said pivot and against axial movement, said steering rod means being rotatable about the axis of said pivot;

(g) a universal joint connecting the other end of said steering rod means to said front portion of said main frame; and (h) a substantially rigid link having two spaced portions respectively hingedly secured to said main frame and to a portion of said steering rod means intermediate said ends thereof.

2. In a vehicle as set forth in claim 1, a resilient member interposed between said truck means and said forward and rearward axle means.

3. In a vehicle as set forth in claim 1, said forward axle means being elongated transversely of the direction of elongation of said main frame and having two end portions; a wheel on each of said end portions, said pivot being substantially equidistant from said wheels.

4. In a vehicle as set forth in claim 1, one of said rigid link portions being hingedly secured to said main frame for rotation about an axis substantially parallel to the direction of elongation of said main frame, and universal joint means connecting the other portion of said rigid link to said steering rod means.

5. In a vehicle as set forth in claim 1, said main frame portions being horizontally spaced from each other, the axis of said pivot extending forward in a substantially horizontal direction.

6. In a vehicle as set forth in claim 1, said main frame portions being horizontally spaced from each other, said truck means being rotatably mounted on the underside of said rear portion, and the axis of said pivot extending forward in a downwardly slanting direction.

References Cited in the file of this patent

UNITED STATES PATENTS

| | | |
|---|---|---|
| 1,163,611 | Brown | Dec. 7, 1915 |
| 2,015,311 | Jonkhoff | Sept. 24, 1935 |
| 2,466,194 | Anderson | Apr. 5, 1949 |
| 2,731,276 | Cross | Jan. 17, 1956 |
| 2,848,244 | Georgi | Aug. 19, 1958 |